Figure 1:
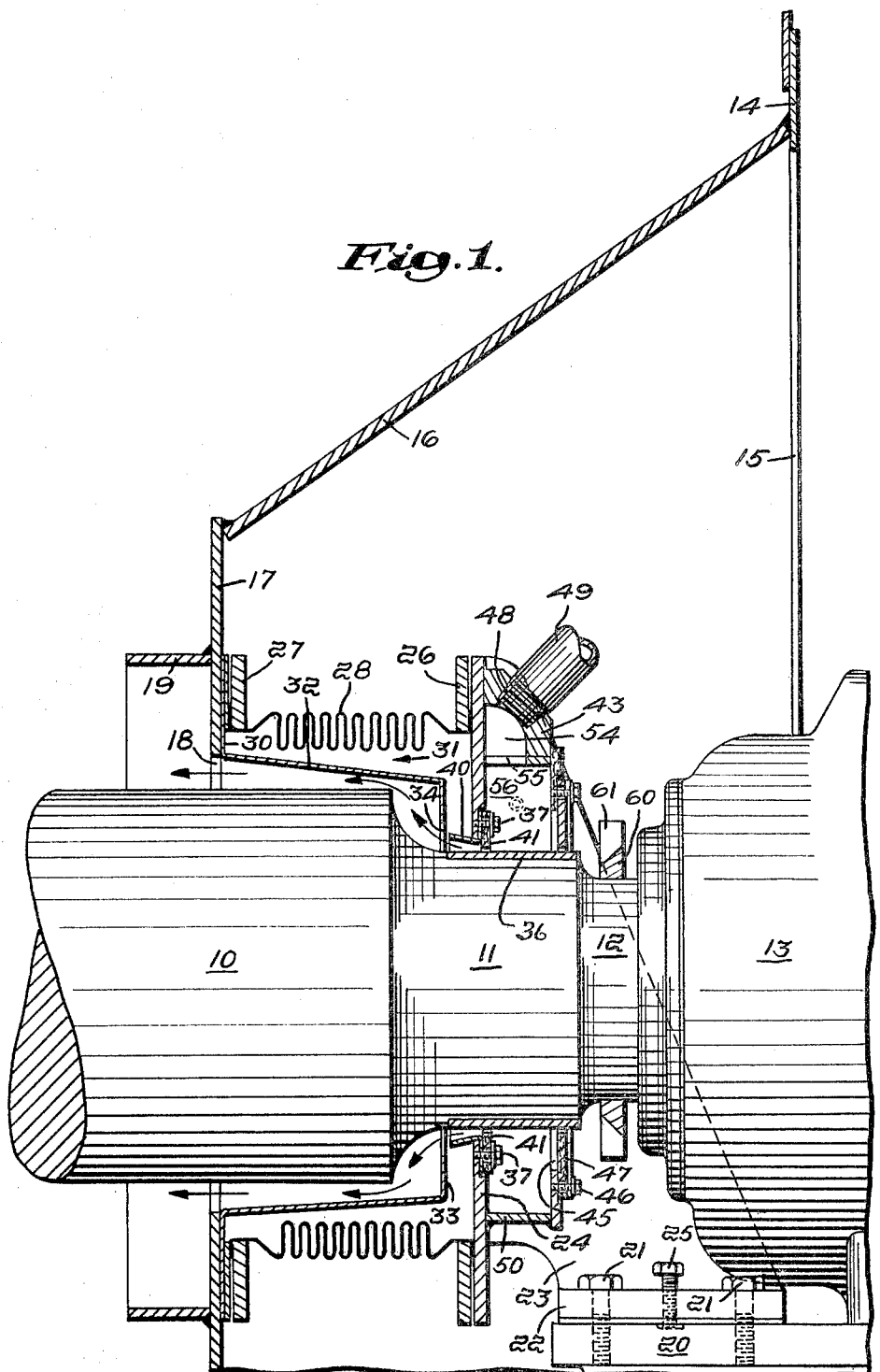

Sept. 13, 1966          J. H. HOFFMAN          3,272,516

PRESSURIZED SEALS FOR THE SHAFTS OF FANS

Filed Dec. 31, 1963          2 Sheets-Sheet 1

Inventor:
Joseph H. Hoffman,
by Robert J. Palmer Attorney

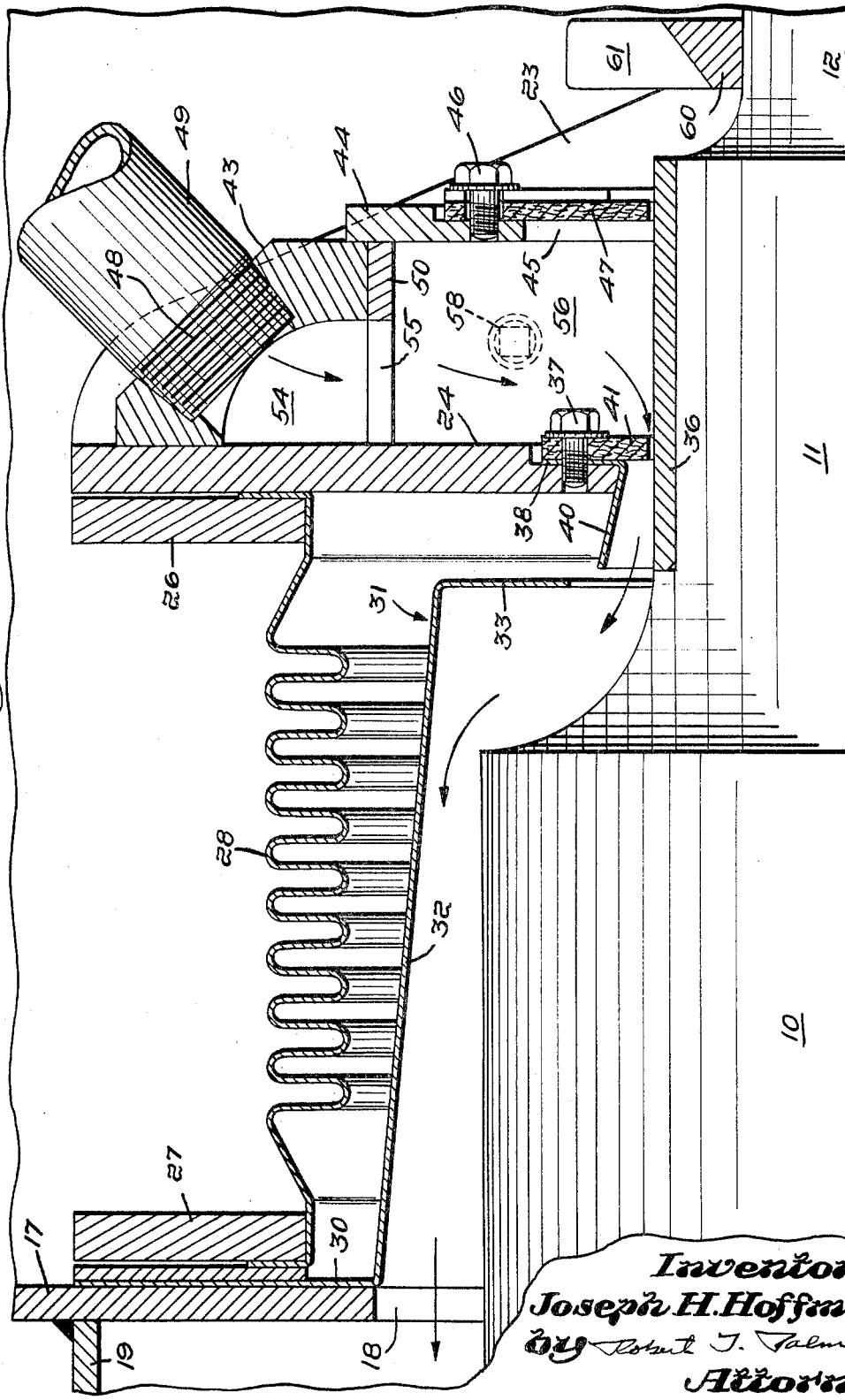

United States Patent Office 3,272,516
Patented Sept. 13, 1966

3,272,516
PRESSURIZED SEALS FOR THE SHAFTS OF FANS
Joseph H. Hoffman, Norwood, Mass., assignor to Westinghouse Electric Corporation, Pittsburgh, Pa., a corporation of Pennsylvania
Filed Dec. 31, 1963, Ser. No. 334,772
8 Claims. (Cl. 277—4)

This invention relates to pressurized seals for the shafts of fans.

Heavy duty fans usually have bearings around their shafts exterior their casings. Such fans may handle very hot or corrosive or toxic gases which should not be permitted to escape through clearance openings around their shafts into apparatus rooms where the fans are located. Seals through which compressed air is supplied into the fan casings at the clearance openings are used to prevent the escape of gas handled by the fans through such openings. One such seal is disclosed in the U.S. Patent No. 3,081,096 of R. V. Woodbury.

An object of this invention is to provide a pressurized seal with cooperating parts which move relative each other during expansion of a fan casing caused by heated gas.

Another object of this invention is to prevent foreign matter entrained in a gas handled by a fan from entering a pressurized seal around the shaft of the fan.

Other objects of this invention are to simplify, reduce the cost of, and reduce the maintenance of pressurized seals for the shafts of fans.

This invention will now be described with reference to the annexed drawings, of which:

FIG. 1 is a fragmentary side view, in section, of a seal embodying this invention, and FIG. 2 is an enlargement of the upper portion of FIG. 1.

A fan shaft has a larger diameter portion 10 to which the fan rotor which is not shown is attached; has an outer reduced diameter portion 11, and has a still further outer portion 12 with a further reduced diameter which extends into a bearing which is not shown, in a bearing housing 13. A casing end wall 14 has a circular opening 15 around the inner end of the housing 13, and has welded thereto around the opening 15, a wall 16 shaped as a frustum of a cone, and which converges inwardly into the fan casing, centrally around the axis of the shaft. Welded to the inner end of the wall 16 is a vertically extending plate 17 having a central opening 18 around the shaft portion 10. An annular plate 19 is welded to the inner surface of the plate 17 centrally around the shaft portion 10, and the opening 18. Attached by bolts 21 to the upper side of horizontally extending base 20 of the bearing housing 13 is a plate 22 to which is attached the outer end of a seal support 23 to the inner end of which is attached a circular plate 24 having a clearance opening around the shaft portion 11. Bolts 25, one of which is shown by FIG. 1, are leveling bolts.

Clamped between a ring 26 attached to the inner side of the plate 24 and a ring 27 attached to the outer side of the plate 17 by bolts which are not shown, are vertically extending ends of a flexible bellows 28. Also clamped between the ring 27 and the plate 17 is vertically extending inner end portion 30 of a sleeve 31 which has an intermediate portion 32 shaped as a frustum of a cone, and which has a vertically extending outer end portion 33 with a circular opening 34 around the shaft portion 11. The sleeve portion 32 diverges from its end portion 33 towards its inner end, and at its inner end has a diameter equal to that of the opening 18 in the plate 17.

A conventional wear sleeve 36 is attached to the outer portion of the shaft portion 11, and extends through the clearance opening in the plate 24. Attached to the outer side of the plate 24 in a recess therein around the clearance opening therein, by bolts 37, is vertically extending outer end portion 38 of a sleeve 40 which diverges towards the opening 34, and has at its inner end a diameter smaller than that of the opening 34 so that the inner end of the sleeve 40 can move freely into and out of the opening 34. Also attached by the bolts 37 to the plate 24 is a conventional, hard asbestos seal ring 41.

Attached to the outer side of the plate 24 is the inner side of a boss 43 which has an outer side to which is attached a ring 44 having a central clearance opening 45 around the outer end portion of the sleeve 36. Attached to the outer side of the ring 44 in a recess therein, by bolts 46 is a ring 47 similar to the ring 41. The rings 41 and 47 have vertically extending slots for permitting adjustment of their clearances around the sleeve 36. The boss 43 is tapped to receive threaded end 48 of tube 49 which is connected to a conventional source of compressed air which is not shown.

An annular plate 50 extends between the inner edge of the boss 43 and the inner side of the plate 44. The boss 43 has an air chamber 54 connecting through opening 55 in the plate 50 with an air chamber 56 bounded by the seal rings 41 and 47, adjacent portions of the plate 24 and the ring 44, and the sleeve 36. A connection 58 is provided for a pressure gauge.

A deflector ring 60 is attached to the shaft portion 12 between the bearing housing 13 and the seal ring 47, and has fan blades 61 thereon for deflecting seal air escaping from the shaft seal between the sleeve 36 and the ring 47 from the bearing in the housing 13, this being conventional.

Operation

In operation, compressed air supplied through the tube 49 passes through the chambers 54 and 56 and through the clearance space between the seal ring 41 and the sleeve 36 into the space between the flared sleeve 40 and the sleeve 36, and passes from the latter space through the opening 34 into the space between the flared sleeve 31 and the shaft portion 10. The compressed air then passes from the latter space through the opening 18 and ring 19 into the fan casing. The smaller, flared sleeve 40 acts as a high velocity nozzle discharging a jet of compressed air into the larger flared sleeve 31 which acts as a lower velocity nozzle discharging a lower velocity jet of compressed air into the fan casing. The bellows 28 permits relative movement of the plate 17 attached through the wall 16 to the casing wall 14, and the plate 24 attached through the support 23 and the plate 22 to the bearing housing 13, and prevents any slight volume of air that might escape at the inner end of the flared sleeve 40, from leaving the seal.

The fan may handle heated air at a temperature as high as 800° F., so that the casing may expand after start up, and move the flared sleeve 31 towards the flared sleeve 40. When this happens, the outer end of the flared sleeve 31 moves outwardly past the inner end of the flared sleeve 40 without contact between the flared sleeves as a result of the opening 34 having a larger diameter than that of the inner end of the flared sleeve 40. The flexibility of the bellows 28 permits such movement.

Dust, dirt and any other foreign particles entrained in the gas moved by the fan, are prevented from entering the seal by the jet action of the flared sleeves 40 and 31. The annular ring 19 at the inner side of the plate 17, prevents any large accumulation of dirt from dropping on the fan shaft at the exit of the flared sleeve 31.

What is claimed is:

1. A pressurized seal for a shaft of a fan having a casing wall through which the shaft extends, comprising a pair of vertically extending, spaced apart plates spaced inwardly of said wall, an inwardly flared, open ended sleeve around and spaced from said shaft and attached to the innermost of said plates, said innermost plate having an opening around said shaft aligned with the opening in the inner end of said sleeve, a smaller, inwardly flared, open ended sleeve around and spaced from said shaft and attached to the outermost of said plates, and with its inner end adjacent to the outer end of said first mentioned sleeve, said inner end of said smaller sleeve having a smaller diameter than said outer end of said first mentioned sleeve, a seal ring around said shaft and attached to said outermost plate adjacent to the outer end of said smaller sleeve, a third, vertically extending plate spaced outwardly of said outermost plate and having an opening around said shaft, a second seal ring around said shaft and attached to said third plate, means including said third and outermost plates and said seal rings, forming an air chamber around said shaft, and means for supplying compressed air into said chamber.

2. A seal as claimed in claim 1 in which there is a flexible bellows around said first mentioned sleeve and the inner portion of said smaller sleeve and attached to said plates of said pair.

3. A seal as claimed in claim 2 in which said shaft has a bearing housing spaced outwardly from said third plate, in which means is provided for supporting said third and outermost plates from said housing, and in which means is provided for supporting said innermost plate from said wall.

4. A seal as claimed in claim 1 in which said shaft has a bearing housing spaced outwardly from said third plate, in which means is provided for supporting said third and outermost plates from said housing, and in which means is provided for supporting said innermost plate from said wall.

5. A seal as claimed in claim 4 in which there is provided an annular ring attached to the inner side of said innermost plate around said opening in said innermost plate.

6. A seal as claimed in claim 1 in which there is provided an annular ring attached to the inner side of said innermost plate around said opening in said innermost plate.

7. A seal as claimed in claim 6 in which there is provided a flexible bellows around said first mentioned sleeve and the inner portion of said smaller sleeve and attached to said plates of said pair.

8. A seal as claimed in claim 7 in which said shaft has a bearing housing spaced outwardly from said third plate, in which means is provided for supporting said third and outermost plates from said housing, and in which means is provided for supporting said innermost plate from said wall.

References Cited by the Examiner
UNITED STATES PATENTS

| | | | |
|---|---|---|---|
| 2,859,053 | 11/1958 | Phelps | 277—174 |
| 3,039,779 | 6/1962 | Laird | 277—70 X |
| 3,081,096 | 3/1963 | Woodbury | 277—4 |

SAMUEL ROTHBERG, *Primary Examiner.*